J. L. KELLOGG.
CEREAL FOOD AND PROCESS OF PRODUCTION.
APPLICATION FILED JUNE 10, 1919.
1,321,753.
Patented Nov. 11, 1919.
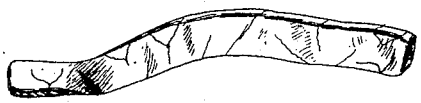
INVENTOR
John L. Kellogg
BY
Clarence L. Burger
ATTORNEY

UNITED STATES PATENT OFFICE.

JOHN L. KELLOGG, OF BATTLE CREEK, MICHIGAN.

CEREAL FOOD AND PROCESS OF PRODUCTION.

1,321,753.     Specification of Letters Patent.     Patented Nov. 11, 1919.

Application filed June 10, 1919. Serial No. 303,026.

*To all whom it may concern:*

Be it known that I, JOHN L. KELLOGG, a citizen of the United States, residing in the city of Battle Creek, county of Calhoun, and State of Michigan, have invented a new and useful Improvement in Cereal Foods and Processes of Production, of which the following is a specification.

My invention relates to the production of a partially cooked cereal food, which can be made ready to serve by saturating and heating with water in a few minutes.

Heretofore cereal foods, known as raw cereals, which have to be thoroughly cooked for serving, have been generally produced in either flake, pearled or granular form such as rolled oats, hominy, cornmeal and the like.

My invention consists, first, in cooking the grains, which may be, for example, corn, rice, oats, wheat or barley, for a sufficient period of time and at a proper temperature to dextrinize partially the starches; then partially drying the grains; then forming the partially cooked and dextrinized grains into shreds, flakes or other appropriate particles, and then toasting the formed particles as will be hereinafter specially described. My invention also consists in forming the grains, partially cooked and dextrinized as above stated, into the specific form of shreds in a manner and of a character which will be hereinafter specifically described.

My invention consists also in the specific processes hereinafter described, which I prefer to employ in the production of this improved cereal food. My invention also consists in the finished product, consisting of the partially cooked and dextrinized dried, formed and toasted particles, having a sweet and palatable flavor and the characteristics of cooking up in hot water, light and fluffy, without losing their separate individuality and without becoming mushy or pasty.

In order that my invention may be fully understood I shall first describe in detail the specific processes which I at present prefer to employ in producing the food in the specific form I now prefer, and also said preferred specific form of the food, and I shall then define the invention in the claims.

Reference is to be had by numbers to the accompanying drawings forming part of this specification in which—

Figure 1, shows substantially one of the particles of the new partially cooked food made from corn in the preferred shredded form ready for market.

Fig. 2, shows substantially the said shredded particle after saturating and heating with water and being ready to serve.

In preparing the new food, I take a sufficient quantity of the specific grain selected, which is in this instance corn, but which may be rice, oats, wheat, barley or any other suitable cereal, and cook the grains for a sufficient period of time, and at a proper temperature partially to dextrinize the starches in the grain.

This cooking may be performed by any suitable device, such as common rotary steam cooker or a steaming device commonly known as a steaming conveyer, where the grain is propelled through the steaming chamber by means of a special conveyer and steamed while passing through the conveyer with live steam.

The temperature or steam pressure used may vary widely and will depend to some extent upon the time consumed in the cooking. I at present prefer to use a steam pressure varying from 15 to 25 pounds, for a period of from 15 to 60 minutes, but where a more thorough cooking is desired the grains may be subjected to steam at a pressure of say 15 pounds for a period of time varying from one to three hours, the result obtained being a partial dextrinization of the starches in the grain.

In some instances, depending to some extent upon the particular grain used, I introduce flavoring material, such as barley malt, sugar and salt, into the food by adding it to the water which is used to cover the grain.

After thus steaming the grain, it is partially dried, usually by either a hot or cold air blast, cold air being generally preferred.

The grain thus cooked so as to partially dextrinize the starches therein, is then formed into separate particles, such as shreds or flakes, of the particular size, shape and character desired, preparatory to the final toasting.

I find that I obtain a finished product with unusual advantages as to cooking, serving and eating by passing the partially dextrinized and dried grains through shredding rolls of such a character as to form preferably short shreds of varying length and about one-eighth (⅛) of an inch in width, and about twenty to thirty one thousandths of an inch in thickness. But many of these advantages may be obtained also with shreds of more substantial size and character.

The shreds thus obtained, or the flakes or formed particles of other character correspondingly produced from the dextrinized grains, are then dried or toasted to make the finished product.

For thus drying or toasting the shreds or other formed particles, they may be passed for example through a flight toasting oven, where the shreds are toasted a light golden brown, and are then ready for packing and marketing. An example of one of the corn shreds thus obtained is shown greatly magnified in Fig. 1.

But instead of a flight toasting oven, any suitable toasting means or process may be used, such as hot air or even an ordinary stove or oven.

To prepare this cereal food for the table it is merely necessary to add thereto enough water—about two cups of water to one cup of the cereal—and heat the whole until the individual shreds or other formed particles are evenly saturated, it taking usually about fifteen or twenty minutes for this operation.

The individual shreds or particles are then in approximately their separate original form, but swollen throughout and light and fluffy, as indicated in Fig. 2, and are ready to serve and eat with cream or milk and sugar as desired.

These partially cooked shreds or particles thus prepared, are very different from cereals prepared by the old method of flaking or granulating, as they do not cook up pasty or mushy, and they retain their original separate form when prepared for serving as described and cook up light and fluffy. Furthermore, as the starches are slightly cooked, and after being shredded or formed into particles, are subjected to dry heat, they become thereby partially dextrinized, making the product a sweet and palatable one, and one that does not require the cooking that cereals ordinarily require before serving.

It is evident that the improved process and product here described may be widely varied and modified without departing from the boundaries of my invention, for a definition of which reference is to be had to the following claims:

1. The process of preparing a partially cooked cereal food from grain, in the performance of which the grain is heated for a period, and at a temperature sufficient to dextrinize partially the starches; the partially cooked and dextrinized grain is then partially dried; is then formed into particles and the separate particles then dried or toasted.

2. The process of preparing a partially cooked cereal food from grain, in the performance of which the grain is subjected to the action of live steam, so as to dextrinize partially the starches in the grain; the partially cooked and dextrinized grain is then partially dried; is then reduced to separate elongated shreds, and the shreds then dried or toasted.

3. The process of preparing a cereal food ready to serve, in the performance of which the grain is heated for a period, and at a temperature sufficient to dextrinize partially the starches; the partially cooked and dextrinized grain is then partially dried, is then formed into separate particles; the particles then dried or toasted; and the particles then saturated and heated with water for about fifteen or twenty minutes until the particles, although retaining their original form are swollen light and fluffy, but not pasty or mushy.

4. A partially cooked cereal food consisting of separate dried or toasted particles of grain in which the starches are partially dextrinized and having a sweet and palatable flavor and the peculiar characteristics of cooking up in hot water light and fluffy without losing their separate form and not becoming mushy or pasty.

5. A partially cooked cereal food consisting of separate dried or toasted elongated shreds, the starches of which are partially dextrinized, and having a sweet and palatable flavor and having the peculiar characteristics of cooking up in hot water light and fluffy without losing their separate shredded form and not becoming mushy or pasty.

6. A partially cooked cereal food consisting of separate dried or toasted particles of grain mixed with flavoring material, in which grain the starches are partially dextrinized, and having a sweet palatable flavor and the peculiar characteristics of cooking up in hot water light and fluffy without losing their separate form and not becoming mushy or pasty.

JOHN L. KELLOGG.